United States Patent

Hanchen

[15] 3,643,765
[45] Feb. 22, 1972

[54] CLAMPING DEVICE FOR AN AXIALLY MOVEABLE PLUNGER SHAFT

[72] Inventor: Siegfried Hanchen, Brunnwiesenstr. 3, 7304, Ruit, Germany

[22] Filed: Oct. 24, 1969

[21] Appl. No.: 869,288

[30] Foreign Application Priority Data

Oct. 24, 1968   Germany ..................... P 18 04 857.2

[52] U.S. Cl. ................................... 188/170, 74/531, 92/26, 188/67
[51] Int. Cl. ..................................................... F16d 65/24
[58] Field of Search ............................. 188/67, 170; 24/531; 248/354 C, 354 H; 92/24, 25, 26; 285/18, 322

[56] References Cited

UNITED STATES PATENTS

| | | | |
|---|---|---|---|
| 1,637,383 | 8/1927 | Livergood | 188/67 X |
| 2,932,214 | 4/1960 | Crouse | 74/531 X |
| 3,203,513 | 8/1965 | Allen | 188/67 X |
| 3,313,029 | 4/1967 | Roch | 188/67 X |
| 3,501,177 | 3/1970 | Jacobs | 285/322 |

OTHER PUBLICATIONS

German application number 1,296,934 6- 1969 Germany Siebelhoff 188- 67.

Primary Examiner—George E. A. Halvosa
Attorney—Arthur Schwartz

[57] ABSTRACT

A clamping device for an axially moveable plunger shaft as used in electroerosion machine tools where clamping and release must be accomplished without any kind of displacement or distortion of the shaft, clamping being effected by a fixed collet-type clamping sleeve with an exterior taper and a spring-loaded matching female sleeve which takes the form of a moveable hydraulic piston inside a stationary housing. Hydraulic pressure against the female sleeve releases the normally clamped shaft. The clamping sleeve itself has a slightly tapered bore to provide initial clamping close to the sleeve shoulders.

9 Claims, 4 Drawing Figures

INVENTOR.
SIEGFRIED HANCHEN
BY Arthur Schwartz
HIS ATTORNEY

CLAMPING DEVICE FOR AN AXIALLY MOVEABLE PLUNGER SHAFT

BACKGROUND OF THE INVENTION

1. Field of the Invention

The invention relates to clamping devices and more particularly to a clamping sleeve for an axially moveable plunger shaft such as are used to carry vertically adjustable precision machining tools. In such an application the preferably hydraulically controlled plunger is locked in placed after a precise vertical feed movement of the tool, and it is important that no axial motion results from clamping or releasing. Even such small motions as a one-hundredth of a millimeter are to be avoided.

2. Description of the Prior Art

For applications of this kind one would normally use a radial clamping device, where a plurality of clamping elements are radially moved against the plunger shaft under hydraulic pressure, for example. Such a device has the disadvantage of being very cumbersome and shows the additional shortcoming that the plunger shaft is not gripped over its entire circumference, thereby requiring higher clamping forces and causing higher unit surface pressures. A less complicated version of a radial clamping device provides clamping movement only from one side, using a locking plunger. But this solution produces deflections in the plunger shaft which cannot be tolerated under the precision requirements applying in this field of application. On the other hand, when several clamping plungers are used for multilateral radial clamping, a costly device results from the need of synchronizing the plunger.

Other known devices use a longitudinally split clamping sleeve to produce even clamping over the entire circumference of the plunger shaft, the sleeve being closed by means of a hydraulic or pneumatic cushion. Another similar suggestion includes a full sleeve with very thin side walls, these walls being clamped against the plunger shaft under a hydraulic cushion. To make such a device workable it is necessary to use a sleeve with extremely thin walls made of a material which permits resilient radial contraction to a smaller diameter. Such devices, in addition to the limitations in design, production, and material selection, have the fundamental disadvantages of requiring the application of hydraulic pressure for the entire period of time during which clamping is desired. Under conditions where the clamped state is the normal state for most of the time and where the plunger shaft is only moved relatively few times, these devices consume much hydraulic pumping energy, subjecting the hydraulic system (the gaskets, for example) to constant stress and wear.

SUMMARY OF THE INVENTION

The invention suggests a concentric safety clamping device which, during the closing and releasing processes, does not move the plunger shaft sideways and which, above all, avoids any kind of axial shaft displacement. This objective is achieved by using a tapered clamping sleeve, the sleeve having a shoulder by which it is axially fixed against a stationary housing which surrounds the vertical plunger shaft. The clamping sleeve has an outer taper which narrows downwardly and is provided with longitudinal slots across its main body so that it can be closed against the plunger shafts by means of a moveable female sleeve having a matching inner taper. The closing is affected by a spring force pushing the female sleeve upward against the fixed clamping sleeve. The female sleeve, arranged in the form of a hydraulic plunger inside the housing, can be moved against the spring force by introducing hydraulic pressure between its upper side and the housing.

Whenever the hydraulic pressure for the plunger feed is cut off, or when the pressure fails due to some operational defect, the plunger shaft is automatically clamped fast, as the spring pressure pushes the female sleeve against the clamping sleeve.

The requirement of avoiding any kind of axial motion during clamping and releasing determines the primary design condition of axially fixing the clamping sleeve. For practical reasons and in order to simplify the overall design, it is suggested to provide the clamping sleeve with a radial shoulder at the upper, bigger diameter of the sleeve taper. The conditions controlling the clamping process with a sleeve of this type are as follows:

The effect of the radial pressures exerted by the female sleeve against the clamping sleeve over the length of their common taper is progressively smaller in the region between the thinnest end or wall portion and the heavier opposite wall portion of the clamping sleeve. On the one hand, the deflection of the tongues, which are formed by the longitudinal slots in the sleeve taper until they make contact with the plunger shaft requires (under an even radial pressure distribution) increasing deformation energy due to the increasing wall thickness. On the other hand, the distances between the force application points and the fixed, opposite end are decreasing, thereby decreasing the leverage arm of the radial pressures.

Thus the forces between the female sleeve and the clamping sleeve, evenly exerted over the length of contact, are more effective on the free tongue extremities than on their fixed end, where their wall thickness is greater. It follows from this that the thin-walled tongue portions contact the plunger shaft earlier and they are subject to greater compressive stress, whereby a greater flattening and also a greater longitudinal elongation occurs on these thin-walled portions than in the portions of greater wall thickness. Past experience has shown that when the tongue ends are first contacting the plunger shaft so that they are subjected to more intensive longitudinal elongation, the plunger shaft undergoes some axial displacement. This is explained by the fact that the heavier portions of the clamping sleeve reach contact with the plunger shaft later and under less pressure, so that the progressively increasing increment of longitudinal elongation becomes cumulatively effective, the thin end of the clamping sleeve being the contact reference point.

The clamping process as described is subject to an additional phenomena opposed to the longitudinal elongation effect, so as to partially compensate for the latter. Its magnitude, however, is very difficult to ascertain and control, and it is therefore desirable to completely eliminate this effect, too, in order to safely avoid any axial displacement. The tongues of the clamping sleeve, initially out of contact with the plunger shaft, make a pivoting motion toward the shaft when the female sleeve is pushed against them, the center of this pivoting motion being located somewhere in the area of heavier wall thickness or in the fixed portion of the sleeve. This pivoting motion is comparable to the deflection of a cantilever beam subjected to a lateral force. There can be no question that the thinnest tongue portions are deflected the most, so as to make a maximum pivoting displacement and to establish clamping contact first. The extremities of the tongues are displaced in an arc until they contact the plunger shaft, which arc can be divided into a major radial motion component and a minor axial motion component. During the clamping process, this axial motion component produces an undesirable axial displacement of the plunger shaft, as soon as not only the tongue extremities, but also the heavier tongue portions are forced into contact with the plunger shaft.

The above-described phenomena thus precludes the use of a conventional cylindrical bored clamping sleeve in applications where even axial motions of a magnitude of a few hundredths of a millimeter must be avoided. It is therefore a necessary objective of the invention to provide a clamping sleeve where these phenomena causing axial displacements of the plunger shaft are eliminated. For this purpose, it is suggested that the bore of the clamping sleeve is gradually widened toward the tongue extremities in a taper or some other appropriate curvilinear profile, so as to compensate for the nonuniformity of clamping forces exerted against the plunger shaft.

The solution suggested by the invention is based upon the consideration that, when the clamping contact is first established in the vicinity of the axially fixed sleeve shoulder, the phenomena of axial displacement through sleeve elongation and tongue pivoting can be safely eliminated. This does not mean that the desirable even distribution of the clamping forces is sacrificed; rather, it has been found that the inventive concept improves the clamping contact. When the female sleeve is forced against such a clamping sleeve having a widened bore, the thin tongue portions are initially deflected toward the shaft but without contacting it. Only when the female sleeve exerts sufficient pressure against the clamping sleeve that the heavy-walled portions of the sleeve are pressed against the plunger shaft, will the thin-walled tongue portions be sufficiently engaged by the female sleeve to make clamping contact with the shaft. This eliminates the earlier phenomena where the tongue extremities contact the plunger shaft first, thereby being subjected to higher compression and elongation, and it also prevents any shaft displacement from the axial motion component of the arcuate displacement of the clamping tongues.

In a further development of the invention, the clamping sleeve is provided with an enlarged bore inside the sleeve shoulder which bore is so arranged that the wall thickness and resistance of the sleeve in its transition to the shoulder are about the same as those of the adjacent portion of the clamping sleeve. In this manner, the sleeve portion immediately adjacent to the shoulder is equally well clamped against the plunger shaft as are the thinner portions of the clamping sleeve.

In order to simplify machining of the sleeve, it is further suggested to provide in the sleeve bore a cylindrical portion adjacent to the enlarged bore inside the sleeve shoulder and to provide the tapered or curvilinear widening in the remaining portion of the sleeve bore.

The material used for the clamping sleeve is preferably a tubular fabric-reinforced synthetic resin or so-called hard paper. The clamping sleeve is provided with a plurality of regularly spaced longitudinal slots in the manner of a collet, the slots being milled into the sleeve starting at the narrow end of the taper and terminating near the sleeve shoulder. In addition, the exterior taper of the sleeve is provided with regularly spaced longitudinal and annular grooves to allow quick escape of the hydraulic fluid from between the contacting surfaces. As both the clamping sleeve and the female sleeve are completely surrounded by hydraulic fluid the arrangement also provides for convenient lubrication of the plunger shaft between its guides. The material suggested for the clamping sleeve assures reliable clamping in spite of the presence of the hydraulic fluid.

DESCRIPTION OF THE PREFERRED EMBODIMENT

Figure 1:
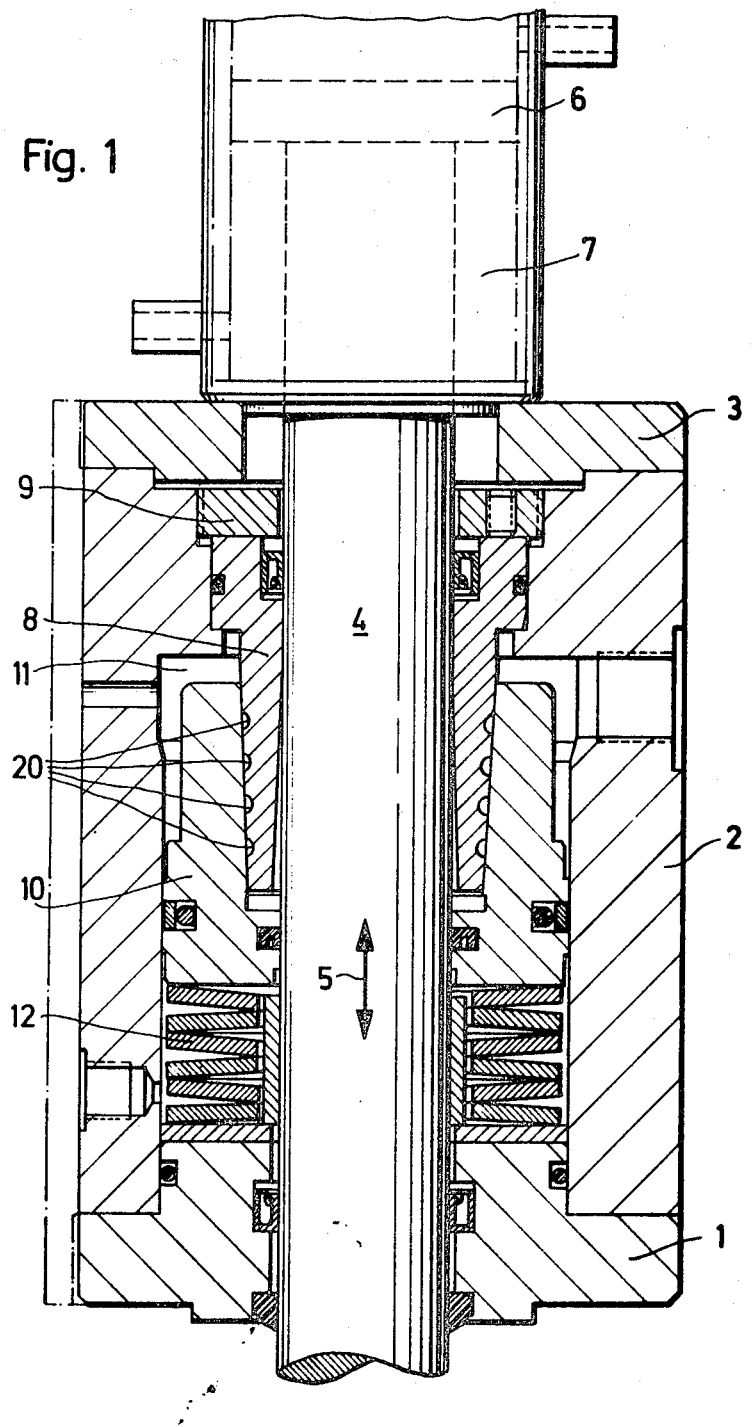
FIG. 1 shows, in a longitudinal cross section, a clamping device embodying the invention.

In FIG. 1 is illustrated a housing consisting of a base 1, a main body 2 and an end cover 3, and inside the housing is guided a plunger shaft 4 moveable in the direction of arrow 5. The plunger shaft 4 is moved by means of a piston 6 which is arranged inside a stationary hydraulic cylinder 7 for double-acting impingement. The main body 2 has in its upper portion a recessed bore into which is inserted a stationary clamping sleeve 8 in coaxial arrangement with the plunger shaft 4. The sleeve 8 is firmly retained in its seat by a threaded ring 9 which in turn is secured against rotation by a set screw. Also surrounding the plunger shaft 4 is a female sleeve 10 which has the form of a clamping piston and which is sealed on the inside against the plunger shaft and on the outside against the bore of the main body. The outer diameter of the clamping sleeve 8 and the bore of the female sleeve 10 having matching tapers. The space between the clamping sleeve 8, the female sleeve 10, and the surrounding main body 2 defines a pressure chamber 11. The moveable female sleeve 10 is normally urged against the fixed clamping sleeve 8 and into the pressure chamber 11 by a clamping spring 12 consisting, for example, of a stack of spring washers. The creation of hydraulic pressure in the pressure chamber 11 counteracts the spring pressure and moves the female sleeve 10 away from the clamping sleeve 8, thereby releasing the plunger shaft for axial motion. As soon as the hydraulic pressure inside the chamber 11 falls below a predetermined value, or when it is completely cut off, the plunger shaft becomes quickly clamped fast inside the stationary housing 1, 2, 3. It is, of course, also possible to provide the clamping force through other means than the spring 12, using, for example, a resilient pneumatic cushion to assure safe clamping. The clamping effect between the clamping sleeve 8 and the female sleeve 10 is self-locking.

Among other applications, the conditions of motion-free clamping and release is particularly required for plunger shafts which carry machining tools in precision machinery, such as, for example, the electrode holder in machine tools using electroerosion machining such as spark erosion machining or electrochemical machining. In these machining processes the electrode must be kept at an extremely small distance from the workpiece. Prior to the start of the machining operation, the electrode is advanced from a retracted position into this position of smaller distance, and after termination of the machining operation, or for an operative pause, the tool is again retracted to its rest position or to an intermediary position. Even though means are preferably provided to automatically control the work position of the machining tool by means of a closed hydraulic feedback control circuit in response to the electronic measurements derived from the spark gap, it may become desirable in certain cases to continue the machining operation on a workpiece from a predetermined precisely adjusted vertical position. It is then necessary that the tool shaft can be clamped in this position without risking any axial motion during clamping. Furthermore, it is desirable to have the tool feed blocked immediately and the electrode maintained in a fixed position, as soon as the supply of electric current should fail, for example. In this way any possible damage to either the tool or the workpiece resulting from an uncontrolled feed motion is eliminated.

Figure 4:
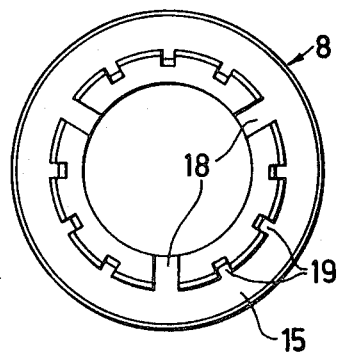
FIG. 4 is an end view of the clamping sleeve.
Figure 3:
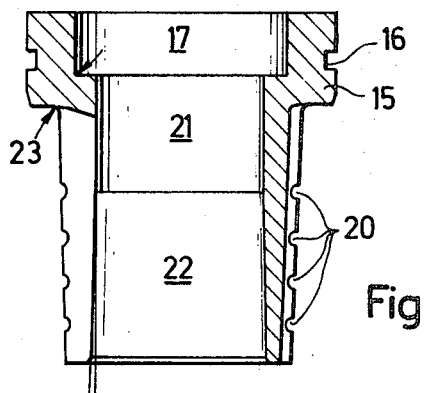
FIG. 3 is a longitudinal cross section of the same sleeve.
Figure 2:
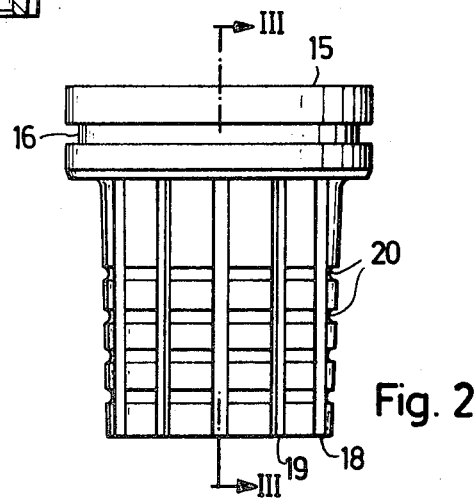
FIG. 2 is a side view of the clamping sleeve of FIG. 1.

The clamping sleeve as illustrated in FIGS. 2, 3, and 4 is provided with a shoulder 15 by which it is firmly retained inside the main body 2 of the housing. In the periphery of the shoulder 15 is provided an annular groove 16 for a ring gasket by which the oil-filled pressure chamber 11 is sealed off against one side. Another seal is provided between the bore of the clamping sleeve 8 and the plunger shaft 4, the seal being inserted into the widened bore portion 17 of the sleeve. The outer diameter of the sleeve itself is smaller than the shoulder portion 15 and further narrows in a taper toward the lower end of the sleeve. FIG. 4 shows that the tapered portion of the sleeve is divided into three tongues by three regularly spaced longitudinal slots 18. On the other surface of the clamping sleeve 8 are provided several longitudinal grooves 19 and annular grooves 20, the purpose of which is to assure an unobstructed escape of the hydraulic fluid from between the tapered contact surfaces.

The bore of the clamping sleeve 8 consists of three portions: a widened portion 17 inside the sleeve shoulder 15, a cylindrical clamping portion 21 adjacent to it, and, following this portion, a gradually widening portion 22 opening toward the lower end of the sleeve. The degree of widening for the embodiment illustrated was chosen no more than 2 angular minutes (one-half the angle of opening), in consideration of the material characteristics and the clamping force required. It is, of course, possible to choose different values for this angle or to choose a bore profile with a variable degree of opening when different wall thicknesses are used or when material with different elongation characteristics under compression are used for the clamping sleeve. The bore portion 21 was made cylindrical to simplify machining of the sleeve, and this compromise between an all-cylindrical bore and a (theoretically superior) all-tapered bore has proved very satisfactory. It is of course, also possible to provide an all-tapered bore in the sleeve 8.

The widened portion 17 of the sleeve bore also serves the purpose of reducing the wall in the transition area 23 between the clamping sleeve proper and the sleeve shoulder 15 to provide a gradual wall transition between them. This arrangement provides for continual force and material conditions over the entire length of the sleeve portion and thereby improves the desired uniform clamping action. In addition, this causes the support region for the three clamping segments or tongues to be shifted radially outward, so that, when the clamping segments pivot around this support region under the action of the female sleeve, they contact the plunger shaft 4 simultaneously and evenly over their entire length. Although not shown in the drawing, it is also made possible by the widened bore 17 to extend the longitudinal slots 18 over the full length of the clamping segments.

I claim:

1. A clamping device for selectively clamping and releasing an axially moveable shaft, comprising in combination:
   a. a stationary housing surrounding a portion of the axially moveable shaft;
   b. a clamping sleeve fixedly attached to the housing near one of its extremities and mounted concentrically with the shaft, the clamping sleeve having a male taper which has its smallest diameter facing away from the attached extremity;
   c. an axially moveable female sleeve with a female taper matching the male taper of the clamping sleeve and which, when pressed thereagainst, causes the clamping sleeve to be radially compressed to a smaller diameter to create a clamping engagement between the fixed clamping sleeve and the shaft;
   d. spring means to force the female sleeve against the fixed clamping sleeve, so as to create a clamping action around the shaft;
   means to separate the female sleeve from the fixed clamping sleeve, so as to eliminate the clamping action and to release the shaft; and
   f. the clamping sleeve having a central bore therein, the bore having a gradually widening bore section opening toward that end of the clamping sleeve facing the female sleeve, the gradually widening bore section being adapted to eliminate axial displacement of the shaft during clamping and releasing action.

2. The device as defined in claim 1, wherein the housing includes a main body having a cylindrical bore for accommodation of a moveable piston therein, the bore being concentric with the shaft; and the female sleeve includes an outer cylindrical surface portion serving as a piston within the housing; and wherein the means to separate the female sleeve from the fixed clamping sleeve include a hydraulic pressure chamber, on e axial side thereof being constituted by the housing on the side where the clamping sleeve is attached, the opposite axial side thereof being constituted by the surface of the female sleeve facing toward the clamping sleeve; the separating means further including means to produce hydraulic pressure inside the chamber, so as to move the female sleeve away from the clamping sleeve.

3. The device as defined in claim 1, wherein the machining tapers of the clamping sleeve and female sleeve are of such an opening angle that, when forcibly engaged, the taper remains in self-locking engagement.

4. The device as defined in claim 3, wherein the clamping sleeve is made of fiber-reinforced synthetic resin.

5. The device as defined in claim 1, wherein the clamping sleeve includes a shoulder portion of enlarged diameter on the side where it is attached to the housing, the shoulder serving for the longitudinal positioning and attachment of the sleeve to the housing; the sleeve further including a main portion carrying the male taper and extending away from the attached shoulder toward the female sleeve, and a transition portion between the shoulder and the main portion.

6. The device as claimed in claim 5, wherein the clamping sleeve has in its main body a plurality of regularly spaced longitudinal slots reaching from the smallest taper diameter to the transition portion, the slots thus dividing the main portion of the sleeve into a number of identical flexible clamping segments.

7. The device as defined in claim 6 wherein the clamping sleeve includes on the surface on its male taper a plurality of longitudinal grooves and annular grooves to facilitate the escape of any fluid medium present between the sleeve taper when they mate for clamping.

8. The device as defined in claim 6, wherein the clamping sleeve includes a central bore with an enlarged bore section inside the shoulder portion the enlarged bore section being so dimensioned that no abrupt change in wall thickness exists between the sleeve main portion and the shoulder.

9. The device as defined in claim 8, wherein the clamping sleeve includes in its central bore a cylindrical bore section located between the enlarged bore section and the gradually widening bore section.

* * * * *